(12) United States Patent
Eichmann

(10) Patent No.: US 10,328,862 B2
(45) Date of Patent: Jun. 25, 2019

(54) ADJUSTABLE RECEIVER STRUCTURE

(71) Applicant: Dalian Eichmann, Canyon County, CA (US)

(72) Inventor: Marty W Eichmann, Canyon County, CA (US)

(*) Notice: Subject to any disclaimer, the term of this patent is extended or adjusted under 35 U.S.C. 154(b) by 0 days.

(21) Appl. No.: 14/417,221

(22) PCT Filed: Jul. 24, 2013

(86) PCT No.: PCT/US2013/051803
§ 371 (c)(1),
(2) Date: Jan. 26, 2015

(87) PCT Pub. No.: WO2014/018616
PCT Pub. Date: Jan. 30, 2014

(65) Prior Publication Data
US 2015/0203049 A1    Jul. 23, 2015

Related U.S. Application Data

(60) Provisional application No. 61/741,813, filed on Jul. 26, 2012.

(51) Int. Cl.
*B60R 9/06* (2006.01)
*B60D 1/52* (2006.01)
*B60D 1/54* (2006.01)
*B60D 1/42* (2006.01)

(52) U.S. Cl.
CPC ............ *B60R 9/06* (2013.01); *B60D 1/42* (2013.01); *B60D 1/52* (2013.01); *B60D 1/54* (2013.01)

(58) Field of Classification Search
CPC ........ B60D 2001/546; B60D 2001/548; B60D 1/42; B60D 1/52; B60D 1/54
USPC ........................................ 224/497, 509, 519
See application file for complete search history.

(56) References Cited

U.S. PATENT DOCUMENTS

| | | | | |
|---|---|---|---|---|
| 5,454,496 A * | 10/1995 | Sumida, Jr. | ............... | B60R 9/06 224/509 |
| 5,664,717 A * | 9/1997 | Joder | ....................... | B60R 9/10 224/502 |
| 5,845,832 A * | 12/1998 | Eichmann | ................ | B60R 9/06 224/509 |
| 6,237,823 B1 * | 5/2001 | Stewart | ................... | B60R 9/065 224/282 |
| 6,701,913 B1 * | 3/2004 | LeDuc | ..................... | B60R 9/06 126/276 |
| 6,974,147 B1 * | 12/2005 | Kolda | ...................... | B60D 1/52 280/506 |
| 7,631,791 B1 * | 12/2009 | Allen | ....................... | B60R 9/10 224/503 |
| 7,686,562 B2 * | 3/2010 | Panzarella | ........... | A61G 3/0209 414/462 |

(Continued)

Primary Examiner — Derek J Battisti
(74) Attorney, Agent, or Firm — Colin P. Abrahams

(57) ABSTRACT

The adjustable receiver structure has a tongue which is mountable into a standard receiver and can be clamped therein. The tongue carries a body and inner and outer arms successively pivoted on the body. The outer arm carries a lock bar and an auxiliary receiver. The lock bar is releasably attached to the body so that it is secured in place during locked condition. When unlocked, the lock bar and auxiliary receiver can swing to an out of the way position. Assembly positions can be selected to choose the assembled height.

8 Claims, 5 Drawing Sheets

(56) References Cited

U.S. PATENT DOCUMENTS

| | | | |
|---|---|---|---|
| 2006/0151555 A1* | 7/2006 | Mills | B60R 9/06 224/509 |
| 2006/0273125 A1* | 12/2006 | Bogoslofski | B60R 9/10 224/509 |
| 2009/0140538 A1* | 6/2009 | Larson | B60P 1/435 296/26.08 |
| 2011/0024473 A1* | 2/2011 | Weiss | B60R 9/06 224/500 |
| 2012/0292357 A1* | 11/2012 | Tennyson | B60R 9/065 224/281 |

* cited by examiner

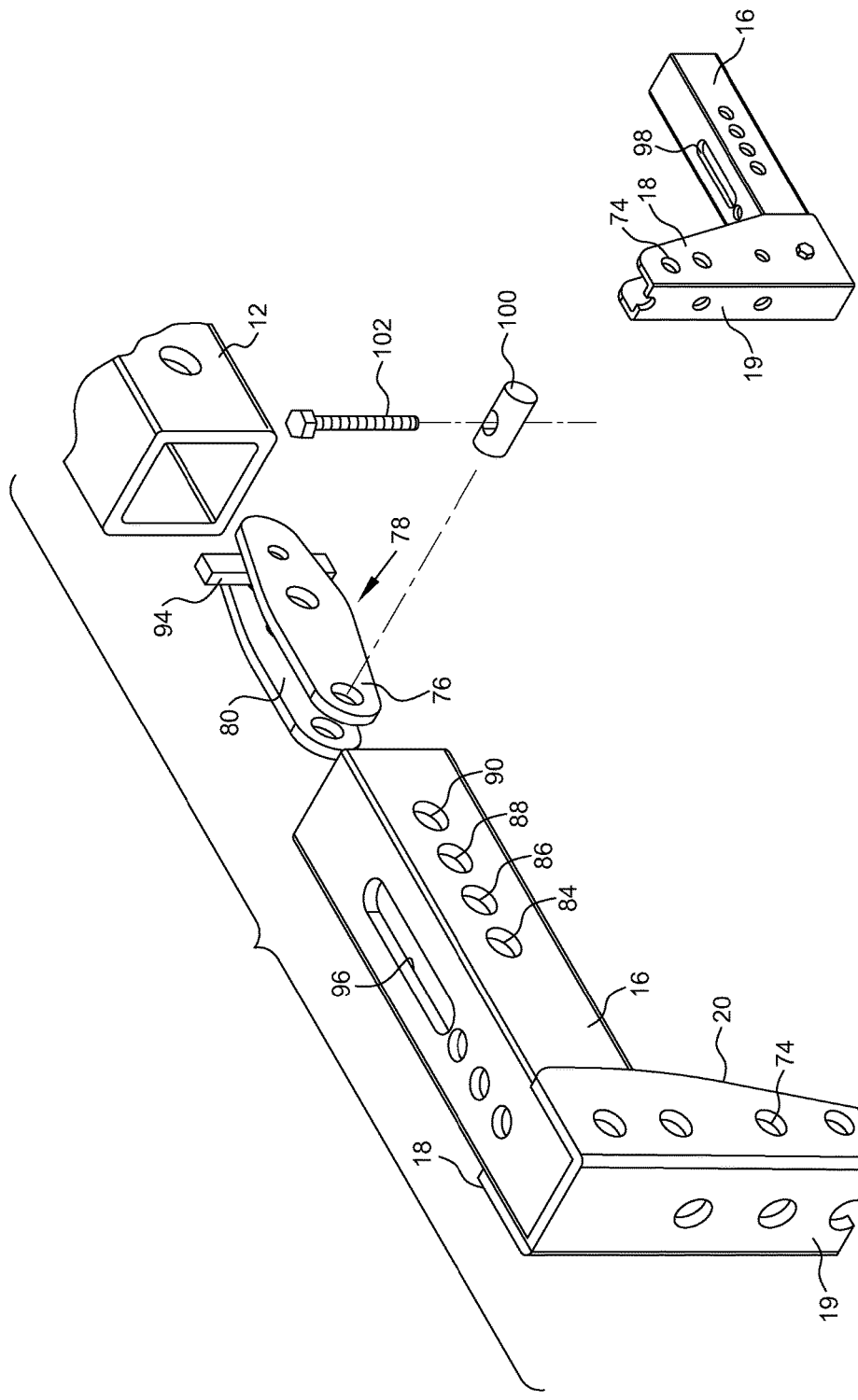

ADJUSTABLE RECEIVER STRUCTURE

This application claims priority of U.S. Provisional Patent Application No. 61/741,813, filed Jul. 26, 2012, the contents of which are incorporated herein in their entirety.

BACKGROUND

Many motor vehicles are equipped with a standard receiver attached to the frame at the center rear of the vehicle. This receiver can receive a bar carrying a trailer hitch ball. This receiver has now been utilized to support other rear-mounted structures, such as wheelchair racks, bicycle racks, and ski racks.

Many times this type of equipment is mounted on the rear of a vehicle which has rear access, such as a tailgate, swing-out doors, or even a trunk. When devices carrying various equipment are carried close to the rear bumper, this position can interfere with access to the rear of the vehicle.

It is desirable to have a receiver structure which mounts in the standard receiver socket in the rear of the normal vehicle, but is adjustable and permits mounting of utility racks of various types. This adjustable receiver structure is configured so that it can be alternatively locked in place when in transit or swung out of the way for access to the rear of the vehicle when parked.

SUMMARY OF THE INVENTION

According to one aspect of the invention, there is provided an adjustable receiving structure comprising: a tongue for a removable installation within the receiver of a motor vehicle; a fixed frame mounted on said tongue; an inner arm pivotally mounted on said fixed frame; an outer arm pivotally mounted on said inner arm; an auxiliary receiver pivotally mounted on said outer arm, said inner and outer arms being configured so that said auxiliary receiver can be swung away from said fixed frame to an extended position and said auxiliary receiver can be swung into a closed position wherein said auxiliary lies adjacent to said fixed frame; and releasable locking structure for releasably locking said auxiliary receiver with respect to said fixed frame.

According to another aspect of the invention, there is provided an adjustable receiver structure comprising: a tongue for removable insertion into the receiver on a vehicle, said tongue defining a horizontal direction; an upright surface on said tongue; a body, said body having a flange having an upright surface thereon, said upright surfaces being in engagement with each other; structure inter-engaging said flange and said tongue to secure said flange onto said tongue at a selected position in an upright direction; an inner arm pivotedly mounted on said body; an outer arm pivotedly mounted on said inner arm; and a lock body mounted on said outer arm, said inner and outer arms being configured so that when in a folded position, said lock body is locked against said upright body to retain said lock body in fixed position with respect to said body.

In yet a further aspect of the invention, there is provided an adjustable receiver structure comprising: a tongue for removable insertion into the receiver on a motor vehicle; a body mounted on said tongue; an inner arm rotatably mounted on said body; an outer arm rotatably mounted on said inner arm; an auxiliary receiver mounted on said outer arm, said arms being pivotable with respect to each other and with respect to said body so that said auxiliary receiver can be positioned in the closed position wherein it lies against said body into an open position wherein it lies away from said body; and clamp structure at least partially within said tongue, said clamp structure including a clamp bar, structure connected to said clamp bar to move said clamp bar from an open unclamped position to a clamped position wherein it engages within the receiver to prevent motion of said tongue within the receiver.

BRIEF DESCRIPTION OF THE FIGURES

FIG. 7 is an isometric exploded view thereof.

FIG. 8 is shows an alternate position of the tongue shown in FIG. 7.

DESCRIPTION OF THE PREFERRED EMBODIMENT

Figure 1:
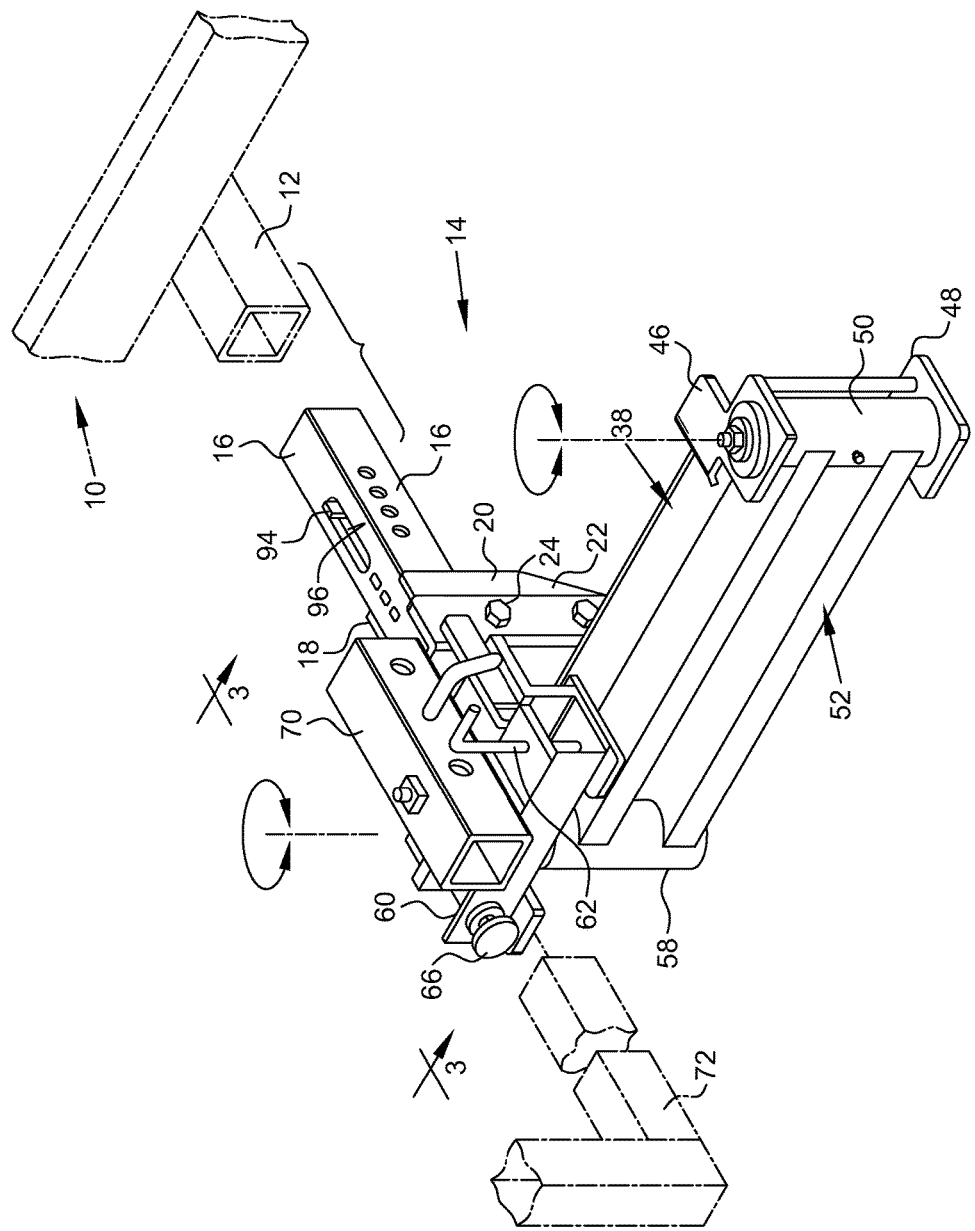
FIG. 1 is art isometric view of the adjustable receiver structure of this invention shown in the closed position and shows in projected position a standard receiver socket and a rack having a tongue.
Figure 4:
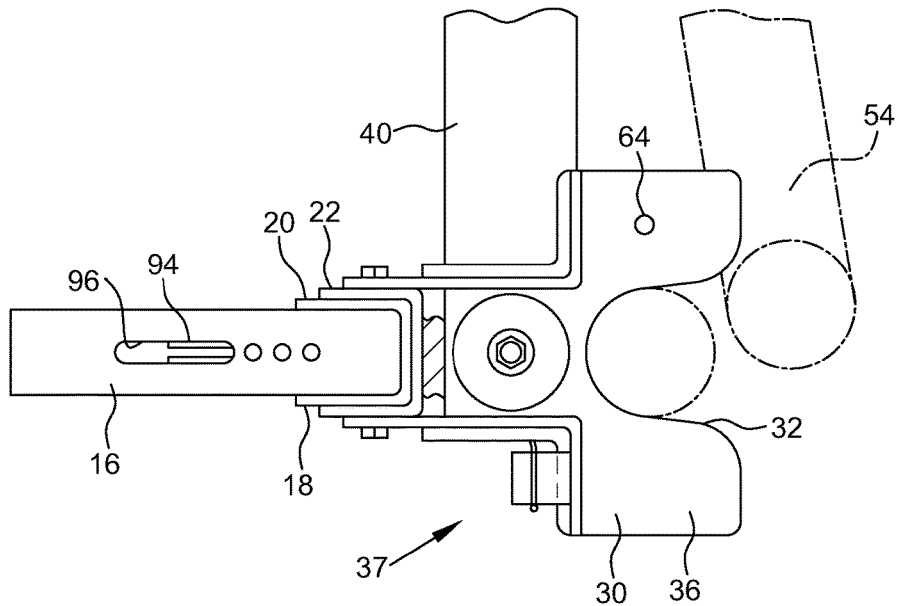
FIG. 4 is a downwardly looking section as seen along the line 4-4 of FIG. 3.
Figure 5:
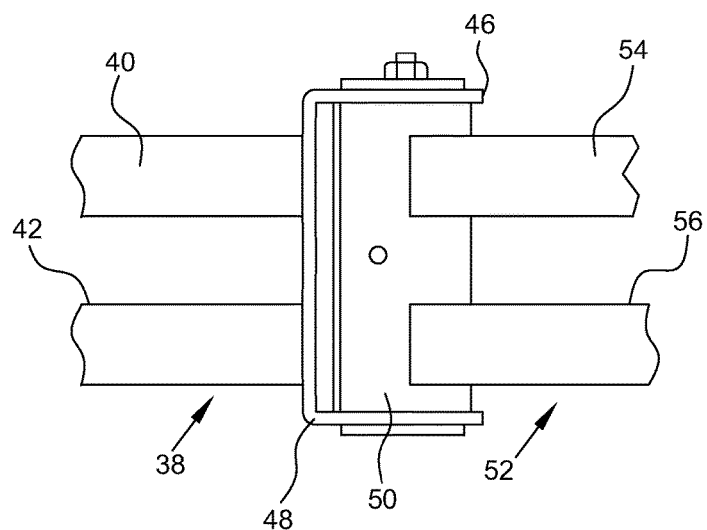
FIG. 5 is an enlarged side elevational view of the center joint, with parts broken away.

FIG. 1 shows a vehicle has a conventional trailer hitch receiver socket 12 attached to the rear thereof. This socket can be used to mount trailer balls, bicycle racks, ski racks, and wheelchair platforms. However, when such devices are mounted thereon, access to the openings of the rear of the vehicle is inhibited. To overcome this inhibition, the adjustable receiver structure 14 is provided. The adjustable receiver structure 14 has a tongue 16 which is sized to slide into the socket 12. It is secured therein by conventional structure such as cross pins. More detail of the matter in which the tongue 16 is secured in the socket is given below. The outer end of the tongue 16 carries cheek plates 18 and 20 thereon. In FIGS. 4, 7, and 8, the cheek plates are shown as flanges of a channel 19. The cheek plate flanges of the channel 19 are secured to the outer end of the tongue such as by welding. They create a large vertical dimension on the side of the tongue.

Channel 22 is an uprightly positioned channel which embraces the cheek plates. Channel 22 is secured in position by means of through bolts, one of which is seen at 24 in FIGS. 1 and 2. There is a plurality of cross holes through the cheek plates so that the vertical position of the channel 22 on the cheek plates can be selected, see FIGS. 7 and 8.

Figure 2:
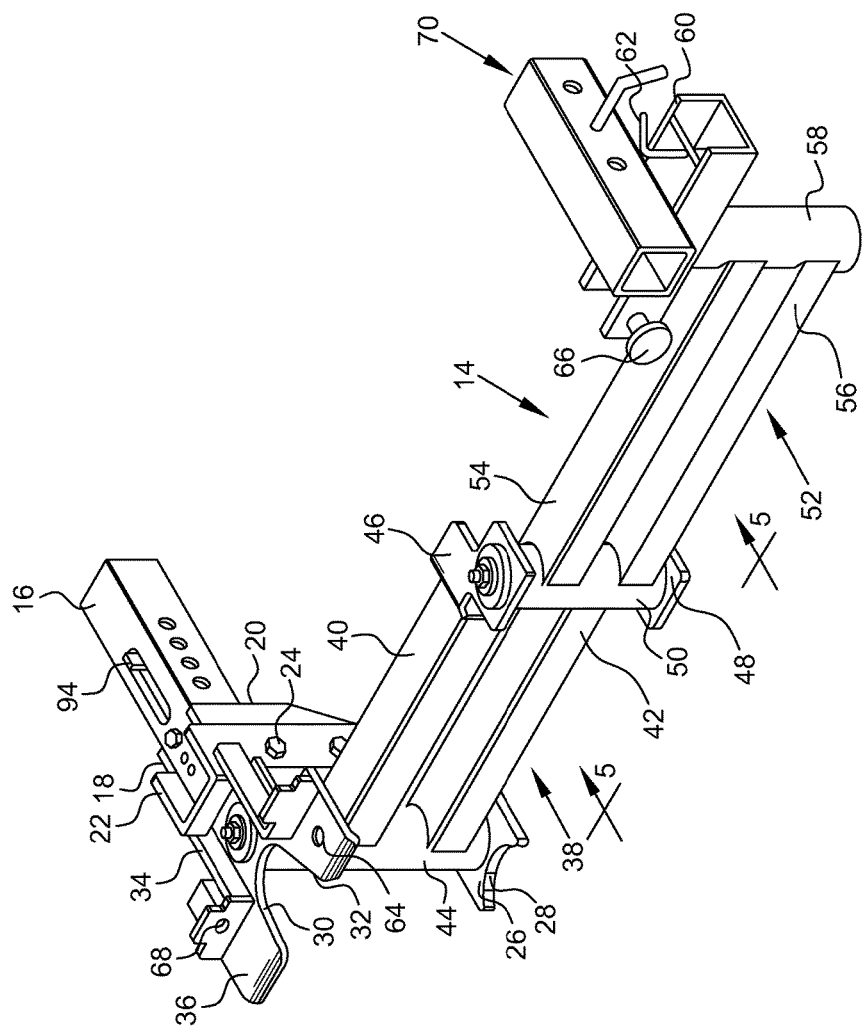
FIG. 2 is a similar view showing the adjustable receiver structure partially opened.
Figure 3:
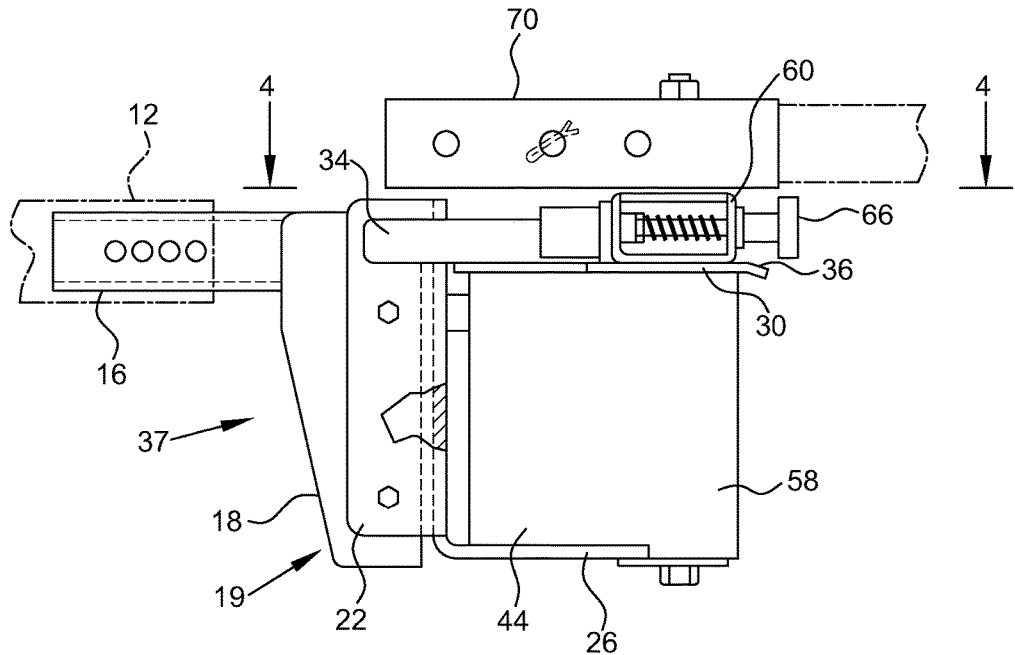
FIG. 3 is an enlarged side view of the inner end of the adjustable receiver structure of this invention, as seen generally along the line 3-3 of FIG. 1.

The channel 22 has integrally formed thereon bottom bearing plate 26, which is seen in FIG. 2 to have a half-round recess 28. The top bearing plate 30 has a half-round recess 32 therein. The top bearing plate is held in place by a strap on each side. The strap 34 is shown in FIGS. 2 and 3. There is a similar strap on the other side. The strap is integrally formed with the top bearing plate which carries the recess 32. It also is integrally formed with support surface 36. This assembly is the fixed portion of the adjustable receiver structure and can be considered fixed body 37.

Inner arm 38 is formed of upper and lower tubes 40 and 42 which are both attached at the inner end to pivot tube 44, see FIG. 2. The pivot tube 44 has bearings therein and is positioned between the upper and lower plates 30 and 26, see FIG. 3. The bearings therein permit the arm 38 to swing around the upright axis defined by the bearings from the position shown in FIG. 1 to the position shown in FIG. 2, and back again. The outer end of arm 38 carries top and bottom bearing plates 46 and 48. The bearing plates are offset and extend rearwardly to provide an offset axis for pivot tube 50.

Outer arm 52 has pivot tube 50 on its inner end and is formed of upper and lower tubes 54 and 56. The upper and lower. tubes are secured together by being ridgedly attached to inner end pivot tube 50 and outer pivot tube 58. The offset of pivot tube 50 permits the outer arm 52 to swing back against the inner arm 38, see FIG. 1.

An upright spindle is mounted in the outer pivot tube 58 so it is rotatable therein. Lock bar 60 is secured on the top of the spindle. The linkage is configured so that when in the folded position shown in FIGS. 1 and 3, the lock bar slides onto and mounts on top of the plate 36. This is the locked position shown in FIGS. 1 and 3. The locked position is the secured position in which the system is locked when access is not required. Locking is accomplished by means of pin 62 engaging in pin hole 64. Additional locking is achieved by means of lock screw 66 being screwed into hole 68, see FIG. 2. In the locked position, the lock bar is secured in place by the two locks, but in addition is supported by the plate 36. Furthermore, the outer pivot tube 58 is engaged in recesses 28 and 32. A rigid assembly is thus achieved when in the closed position.

Auxiliary receiver 70 is securely attached on top of the lock bar 60 as by welding. The auxiliary receiver 70 is tubular and is sized to receive the tongue which is to be mounted thereon. Tongue 72 is shown in dashed lines in FIG. 1 to represent a further attachment. This is a standard tongue which inserts into the auxiliary receiver 70 and is secured therein by means of convention attachment, such as cross pins or bolts.

When folded, in the position shown in FIG. 1, the structure is very solid. The lock bar engages on and is securely attached directly to the structure which is attached to the shoulder 22. Thus, the flexibility of the arms does not enter into flexibility of the auxiliary receiver when the structure is in its locked position shown in FIGS. 1 and 3.

When it is desired that access to the rear of the vehicle be achieved, the lock bar is released from the shoulder structure by releasing the screw 66 and pulling the pin 62. Thereupon, the lock bar can be swung away from its supported recess and both arms can swing out on their pivots so that the auxiliary receiver 70 can be swung away. It can be swung away to the right as shown in FIG. 2, but it can be swung straight back or to the left. Furthermore, the lock bar is pivoted on outer arm 62. Therefore the equipment mounted on the auxiliary receiver rotates on the lock bar pivot. In this way, access to the rear of the vehicle is achieved. Replacement of the structure back to the locked position is easy to achieve simply by folding the arms, putting the lock bar in place, and securing it therein.

The height of receiver 12 determined by the vehicle on which it is attached. The desired height of the auxiliary receiver 70 is determined by the equipment installed in the auxiliary receiver. Thus, it is desirable to have the height of the auxiliary receiver with respect to the height of the tongue 16 be selectable. Such selectivity is achieved by having a plurality of selectable mounting bolt holes in the channel 19, see FIG. 7. The vertical positioning of the channel 22 can be selected on the channel 19 by aligning appropriate bolt holes and installing bolts thereon. Selectable bolt hole 74 is shown in FIGS. 7 and 8. In addition, when assembling the adjustable receiver structure 14, it can be assembled with the channel directed downwardly, as shown in FIGS. 1, 2, and 7. Alternatively, when it is desired that the auxiliary receiver be higher, it can be assembled with the channel 19 directed upwardly as shown FIG. 8. This provides a wide range of selectable height positions for the auxiliary receiver 70.

Figure 6:
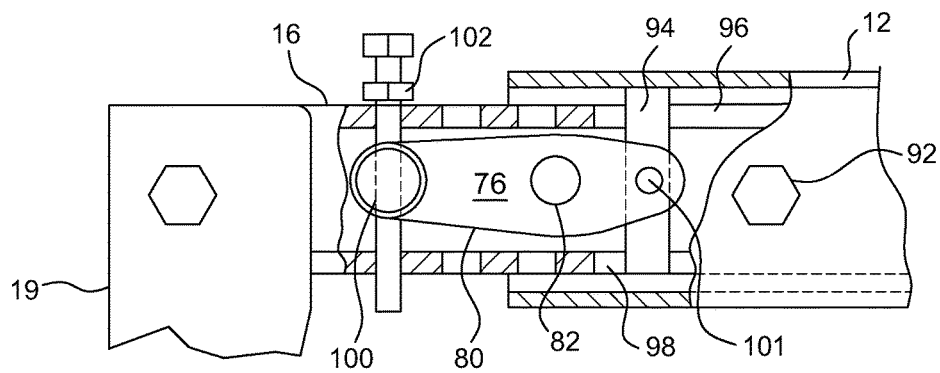
FIG. 6 is a side elevational view of the tongue of the receiver structure inserted into a standard receiver, with parts broken away and parts taken in sections.

When the receiver structure 14 is in the closed and locked position as shown in FIG. 1, it is mechanically solid. The free end, carrying the auxiliary receiver, is rigidly clamped to the mounting structure which extends all the way to the tongue 16. However, the receiver 12 may have an oversized opening therein for the receipt of the tongue 16. Such is usual because the tolerances are large and the receivers are supplied by other vendors. Thus, the installation of the tongue into the receiver structure 14 is useful but may rattle. It is desirable to eliminate that looseness. Clamp structure 76 is shown in FIGS. 6 and 7. The clamp structure 76 comprises clamp levers 78 and 80 which are mounted on pivot pin 82. The pivot pin is selectively mounted in one of the three holes 84, 86, and 88, depending upon the manner in which the receiver 12 is structured. The forward hole 90 is for pinning the tongue 16 in the receiver 12. The pin 92, seen in FIG. 6, represents a conventional pin which passes through the transverse hole in the receiver 12, shown in FIG. 7, and the pin hole 90, thus locking the tongue into the receiver. The clamp structure 76 is positioned outward from this cross pin through the receiver.

The forward end of the clamp levers carry clamp bar 94. When the structure is assembled, the clamp bar 94 fits into the upper and lower slots 96 and 98 in the tongue 16 as shown in FIG. 6. The clamp bar 94 is carried on a pivot 101 which engages through the forward end of the two clamp levers 78 and 80. The after end of the clamp levers 78 and 80 carry nut 102. Nut 100 is in the form of a cylinder which is rotatably engaged into holes in the rear end of the clamp levers. Clamp bolt 102 extends down through one of the bolt holes, for example bolt hole 102, in the top of the tongue and threadedly engages in the threaded cross hole in nut 100. When the bolt is tightened in the clockwise direction, the outer end of the clamp levers is lifted, thrusting the clamp bar down with respect to the tongue to thrust the tongue 16 upwardly in receiver 12. If preferred, the clamp hole can be rotated to thrust the outer end of the clamp levers down to raise the clamp bar to thrust the tongue down in the receiver. In either case, the slack is taken up to eliminate rattle. The clamp can be released by reverse rotation of the clamp bolt.

This invention has been described in its presently and most preferred embodiment. It is clear that it is susceptible to numerous changes and modifications within the scope of the invention. Thus, the scope is limited by the scope of the following claims.

The invention claimed is:

1. An adjustable receiving structure comprising:
a tongue having a first end for removable installation within a receiver of a motor vehicle, and a second end;
a fixed frame with a vertical channel mounted on the second end of said tongue;
an inner arm having a first end pivotally mounted on said fixed frame and rotatable thereon at a first pivot point, and a second end;
an outer arm having a first end pivotally mounted on the second end of said inner arm and rotatable thereon at a second pivot point, and a second end;
an auxiliary receiver which has a receiving shape and size which corresponds to the receiver of the motor vehicle and which is pivotally mounted on the second end of said outer arm at a third pivot point;

the auxiliary receiver being movable between a first closed position wherein the inner arm pivots relative to the fixed frame at the first pivot point and the outer arm pivots relative to the inner arm at the second pivot point and the auxiliary receiver is pivoted at the third pivot point so that the tongue and auxiliary receiver are substantially axially parallel and vertically aligned and the auxiliary receiver lies adjacent to said fixed frame, and a second open position wherein the inner arm pivots relative to the fixed frame at the first pivot point and the outer arm pivots relative to the inner arm at the second pivot point and the auxiliary receiver is pivoted at the third pivot point so that such that it is moved away from the tongue and the auxiliary receiver is swung away from the fixed frame to an extended position; and releasable locking structure for releasably locking said auxiliary receiver with respect to said fixed frame.

2. The adjustable receiver structure of claim 1 wherein said outer arm has an outer end and said locking structure has a lock bar which is pivotally mounted on said outer end of said outer arm and said auxiliary receiver is mounted on the outer end of said outer arm, said lock bar directly engaging said fixed frame when said adjustable receiver structure is in its folded position.

3. The adjustable receiver structure of claim 2 wherein there is a bearing plate on said fixed frame and said locking structure pivoted on the outer end of said outer arm rests on said bearing plate when in the closed position so that loads onto the auxiliary receiver are transferred to said bearing plate and to said fixed frame.

4. The adjustable receiver structure of claim 1 wherein said channel of said fixed frame has flanges which embrace said tongue and there is a plurality of openings through said channel and through said tongue so that said channel can be secured in the selected position on said tongue to select the height of said fixed frame.

5. The adjustable receiver structure of claim 4 wherein there is a clamp mounted on said tongue, said clamp being configured so that when said tongue is inserted into a receiver, said clamp can clamp said tongue with respect to said receiver to achieve a rigid assembly.

6. The adjustable receiver structure of claim 5 wherein said clamp comprises a clamp lever pivotally mounted within said tongue and a clamp bar mounted on said clamp lever, said clamp bar being positioned and sized so that when said clamp lever is actuated said clamp bar extends from said tongue to engage against the inner wall of the receiver to clamp said clamp bar with respect to the receiver, and there is an actuator for actuating said clamp lever into and out of clamped position.

7. The adjustable receiver structure of claim 1 wherein there is a lock bar mounted on said outer arm and there is a bearing plate mounted on a body, said bearing plate being positioned so that it engages under said locked bar in the closed position, said auxiliary receiver being attached to said locked bar so that said auxiliary receiver is firmly secured in the folded position.

8. The adjustable receiver structure of claim 7 wherein said lock bar is pivotedly mounted on said outer arm and there is at least one attachment structure releasably securing said lock bar to said body, said auxiliary receiver being attached to said lock bar in such a manner that said auxiliary receiver is parallel to said tongue when said lock bar is in its secured position.

* * * * *